United States Patent
Paredes Cabrera et al.

(10) Patent No.: US 10,292,174 B2
(45) Date of Patent: May 14, 2019

(54) SERVICE AWARE ADMISSION CONTROL

(71) Applicant: Telefonaktiebolaget LM Ericsson (publ), Stockholm (SE)

(72) Inventors: Ricardo Paredes Cabrera, Ottawa (CA); Jianning Liu, Ottawa (CA); Vijayashree Sundaram, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 417 days.

(21) Appl. No.: 14/758,582

(22) PCT Filed: May 14, 2015

(86) PCT No.: PCT/IB2015/053573
§ 371 (c)(1),
(2) Date: Jun. 30, 2015

(87) PCT Pub. No.: WO2015/193751
PCT Pub. Date: Dec. 23, 2015

(65) Prior Publication Data
US 2016/0249372 A1    Aug. 25, 2016

Related U.S. Application Data

(63) Continuation-in-part of application No. 14/368,905, filed on Jun. 26, 2014, now Pat. No. 9,444,679.

(30) Foreign Application Priority Data

Jun. 16, 2014    (WO) .................. PCT/IB2014/062276

(51) Int. Cl.
*H04W 72/10*    (2009.01)
*H04L 12/911*    (2013.01)
(Continued)

(52) U.S. Cl.
CPC ......... *H04W 72/10* (2013.01); *H04L 41/5006* (2013.01); *H04L 41/5009* (2013.01);
(Continued)

(58) Field of Classification Search
CPC . H04W 28/0257; H04W 28/10; H04W 28/16; H04W 28/085; H04W 36/0027;
(Continued)

(56) References Cited

U.S. PATENT DOCUMENTS

2007/0253365 A1    11/2007  Hedberg et al.
2012/0014251 A1*   1/2012   Arnott .................. H04L 5/0007
                                                      370/232
(Continued)

FOREIGN PATENT DOCUMENTS

EP    2 693 800 A1    2/2014
WO    2014036326 A2   3/2014

OTHER PUBLICATIONS

International Search Report and Written Opinion dated Jul. 20, 2015 for International Application Serial No. PCT/IB2015/053573, International Filing Date—May 14, 2015 consisting of 13-pages.
(Continued)

*Primary Examiner* — Hoang-Chuong Q Vu
(74) *Attorney, Agent, or Firm* — Christopher & Weisberg, P.A.

(57) ABSTRACT

A base station for performing admission control at a service level is provided. The base station includes a communication interface configured to receive a bearer message for a service. The base station includes a processor configured to, in response to receiving the bearer message, determine a plurality of bearers required to support the service. The processor is further configured to determine whether to admit all of the determined plurality of bearers, and in response to determining to admit all of the determined
(Continued)

plurality of bearers, admit the service with all of the determined plurality of bearers.

22 Claims, 10 Drawing Sheets

(51) Int. Cl.
| | |
|---|---|
| *H04L 12/923* | (2013.01) |
| *H04W 72/04* | (2009.01) |
| *H04W 76/18* | (2018.01) |
| *H04L 12/24* | (2006.01) |
| *H04W 76/02* | (2009.01) |
| *H04M 7/00* | (2006.01) |
| *H04W 76/36* | (2018.01) |
| *H04W 76/34* | (2018.01) |
| *H04W 76/15* | (2018.01) |
| *H04W 28/02* | (2009.01) |
| *H04W 76/06* | (2009.01) |
| *H04L 12/851* | (2013.01) |

(52) U.S. Cl.
CPC .......... *H04L 41/5019* (2013.01); *H04L 47/72* (2013.01); *H04L 47/74* (2013.01); *H04L 47/748* (2013.01); *H04W 72/0413* (2013.01); *H04W 76/027* (2013.01); *H04W 76/18* (2018.02); *H04L 47/245* (2013.01); *H04M 7/006* (2013.01); *H04W 28/0252* (2013.01); *H04W 28/0268* (2013.01); *H04W 76/025* (2013.01); *H04W 76/064* (2013.01); *H04W 76/066* (2013.01); *H04W 76/15* (2018.02); *H04W 76/34* (2018.02); *H04W 76/36* (2018.02)

(58) Field of Classification Search
CPC . H04W 36/28; H04W 72/0486; H04W 72/06; H04W 72/08
See application file for complete search history.

(56) References Cited

U.S. PATENT DOCUMENTS

| | | | | |
|---|---|---|---|---|
| 2012/0099416 | A1* | 4/2012 | Bekiares | H04L 47/2441 370/216 |
| 2012/0307631 | A1* | 12/2012 | Yang | H04L 47/127 370/230 |
| 2012/0307770 | A1* | 12/2012 | Kubota | H04W 28/0268 370/329 |
| 2013/0143574 | A1* | 6/2013 | Teyeb | H04W 36/0011 455/438 |
| 2013/0170357 | A1* | 7/2013 | Anchan | H04L 65/4076 370/237 |
| 2014/0011510 | A1* | 1/2014 | Balck | H04W 76/38 455/452.1 |
| 2014/0086159 | A1* | 3/2014 | Sajadieh | H04W 72/12 370/329 |
| 2014/0177535 | A1* | 6/2014 | Tjandra | H04W 72/10 370/329 |
| 2014/0204736 | A1* | 7/2014 | Bakker | H04W 8/22 370/230 |
| 2015/0117344 | A1* | 4/2015 | Arvidsson | H04W 76/027 370/329 |
| 2015/0351136 | A1* | 12/2015 | Kaura | H04W 76/064 370/329 |
| 2016/0021592 | A1* | 1/2016 | Vesely | H04W 36/0072 370/331 |
| 2016/0057766 | A1* | 2/2016 | Linden | H04W 72/1263 370/329 |

OTHER PUBLICATIONS

3GPP TSG-RAN WG3 #55-bis, St. Julian, Malta, Mar. 27-30, 2007, Tdoc R3-070638, Agenda Item: 7.19, Source: Ericsson, Title: "SAE Bearer Management Procedures on S1", Document for Approval consisting of 4-pages.

3GPP TS 36.413 V12.1.0 (Mar. 2014) 3rd Generation Partnership Project; Technical Specification Group Radio Access Network; Evolved Universal Terrestrial Radio Access Network (E-UTRAN); S1 Application Protocol (S1AP); Release 12) Mar. 17, 2014 consisting of 285-pages.

3GPP TS 36.413 V12.3.0 (Sep. 2014) 3rd Generation Partnership Project; Technical Specification Group Radio Access Network; Evolved Universal Terrestrial Radio Access Network (E-UTRAN); S1 Application Protocol (S1AP) (Release 12) Sep. 22, 2014 consisting of 290-pages.

ETSI TS 136 331 V12.3.0 (Sep. 2014) LTE; Evolved Universal Terrestrial Radio Access (E-UTRA); Radio Resource Control (RRC); Protocol specification (3GPP TS 36.331 version 12.3.0 Release 12) Sep. 23, 2014 consisting of 383-pages.

* cited by examiner

SERVICE AWARE ADMISSION CONTROL

CROSS-REFERENCE TO RELATED APPLICATIONS

This application is a Submission Under 35 U.S.C. § 371 for U.S. National Stage Patent Application of International Application Number: PCT/IB2015/053573, filed May 14, 2015 entitled "SERVICE AWARE ADMISSION CONTROL," which claims priority to International Application Number: PCT/IB2014/062276, filed Jun. 16, 2014, entitled "WIRELESS COMMUNICATION NETWORK BEARER MANAGEMENT," the entirety of which both are incorporated herein by reference.

FIELD

The present disclosure relates to a method, base station and system for a communication system, and in particular to admission control for services in the communication system.

BACKGROUND

In a wireless communication system, such as a long term evolution (LTE) communication system, services are provided to a subscriber on radio bearers. Radio bearers are channels that carry audio, video, data, and/or control signaling between a network node, such as a mobile management entity (MME), and a base station or between a base station and a wireless device, e.g., user equipment (UE), of a subscriber. For example, voice packets of a voice-only service between a landline caller and a wireless subscriber are carried by an uplink bearer carrying voice packets and overhead from the wireless device of the wireless subscriber to the base station, and a downlink bearer carrying voice packets and overhead from the base station to the wireless device. Also, a transport bearer carries voice and overhead from the base station to a network node that is connected to the public switched telephone network (PSTN) or backhaul network, and another transport bearer carries voice and overhead from the network node to the base station.

The base station and network nodes currently use the bearer as the level of granularity to manage connections. For example, Third Generation Partnership Project (3GPP) Technical Specification (TS) 36.413 version 12.3.0 defines procedures to create and modify a bearer in which some services, such as video and voice over Internet protocol (VoIP) or voice over LTE (VoLTE) require at least two bearers in each direction, one for carrying voice and one for call signaling. For such services, a first downlink bearer carries voice from the serving base station to the wireless device and a second downlink bearer carries signaling from the serving base station to the wireless device. Similarly, a first uplink bearer carries voice from the wireless device to the serving base station and a second uplink bearer carries signaling from the wireless device to the serving base station. Further, four transport bearers carry voice and signaling between the base station and the network node.

Since 3GPP TS 36.413 v 12.3.0 defines only admission control at the bearer level, it takes several requests to create or modify all bearers associated with a service. It also takes several admission control passes to admit such a multi-bearer service. This means that if a bearer associated with a service fails, the remaining bearers associated with the service continue to be reserved for the failed service, thereby unnecessarily tying up resources. For example, a service may be partially admitted, i.e., some bearers associated with the service have been admitted, but the rest of the bearers fail to gain admittance. The same is true for service modification and deletion where a service may be partially modified or partially deleted as only some bearers are successfully modified or deleted while the other bearers failed to be modified or deleted, thereby negatively affecting resource usage of the system. These partially admitted/modified/deleted services disadvantageously result in a service that does not work and unnecessarily ties up resources, e.g., bearers, that would otherwise be used for another service.

SUMMARY

The present disclosure advantageously provides a method and base station for service level admission control. According to one embodiment of the disclosure, a base station performs admission control at a service level. The base station includes a communication interface configured to receive a bearer message for a service. The base station includes a processor configured to, in response to receiving the bearer message, determine a plurality of bearers required to support the service. The processor is further configured to determine whether to admit all of the determined plurality of bearers, and in response to determining to admit all of the determined plurality of bearers, admit the service with all of the determined plurality of bearers.

According to one embodiment of this aspect, the processor is further configured to, in response to determining not to admit all of the determined plurality of bearers, deny the service. According to one embodiment of this aspect, the determining whether to admit all of the determined plurality of bearers includes determining whether resources are available for the determined plurality of bearers, and in response to determining that resources are available for all of the determined plurality of bearers, determining to admit all of the plurality of bearers.

According to one embodiment of this aspect, the bearer message includes at least one service level Allocation and Retention Priority, ARP, parameter for the service. The at least one service level ARP parameter identifies an importance of the service compared to at least one other service. The processor is further configured to determine that resources are unavailable for at least one of the determined plurality of bearers and determine whether service level pre-emption is available for the service based on the at least one service level ARP parameter. The processor is further configured to, if service level pre-emption is available, determine whether at least one other service can be pre-empted, and in response to determining that at least one other service can be preempted, cause resources associated with the other service to be released from the other service. The processor is further configured to allocate the released resources to the at least one of the determined plurality of bearers.

According to one embodiment of this aspect, the at least one service level ARP parameter includes at least one of a priority level parameter, a service pre-emption capability parameter and a service pre-emption vulnerability parameter. The priority level parameter indicates a priority of allocation and retention for the service. The service pre-emption capability parameter indicates the pre-emption capability of the request service on other services. The service pre-emption vulnerability parameter indicates vulnerability of the service to pre-emption by other services.

According to one embodiment of this aspect, the determined at least one other service that is preempted is associated with a service pre-emption vulnerability parameter that allows pre-emption and an ARP priority level parameter of the other service indicates a lower priority than the ARP priority level of the service. According to one embodiment of this aspect, the processor is further configured to, in response to determining that at least one other service cannot be preempted, determine at least one service that allows for bearer level pre-emption. The processor is further configured to, in response to determining at least one service that allows for bearer level pre-emption, perform bearer level pre-emption to preempt at least one bearer associated with the at least one service that allows for bearer level pre-emption.

According to one embodiment of this aspect, the bearer message includes a service profile identifier, ID, and the determining of the plurality of bearers required to support the service being based at least in part on the service profile ID. According to one embodiment of this aspect, the communication interface is further configured to receive a bearer modification request. The processor is further configured to one of allow and reject the modification to the service based at least in part on whether the service, as modified by the bearer modification request, would meet a quality of service requirement for the service. According to one embodiment of this aspect, the processor is further configured to determine whether to terminate at least one bearer for the service, and in response to determining to terminate the at least one bearer, determine the plurality of bearers associated with the service based at least in part on the service ID. The processor is further configured to terminate all bearers associated with the service.

According to one embodiment of this aspect, the determining whether to terminate at least one bearer for the service includes determining at least one of service termination and admission rejection during service modification has occurred.

According to one embodiment of this aspect, the bearer message includes at least one bearer level Allocation and Retention Priority, ARP, parameter. The processor is further configured to determine a service profile identifier, ID, associated with the service based at least in part on the at least one bearer level ARP parameter. The determining of the plurality of bearers required to support the service is based at least in part on the service profile ID.

According to another embodiment of the disclosure, a method for performing admission control at a service level at a base station is provided. A bearer message for a service is received. In response to receiving the bearer message, a plurality of bearers required to support the service are determined. A determination is made whether to admit all of the determined plurality of bearers. In response to determining to admit all of the determined plurality of bearers, the service with all of the determined plurality of bearers is admitted.

According to one embodiment of this aspect, in response to determining not to admit all of the determined plurality of bearers, the service is denied. According to one embodiment of this aspect, the determination of whether to admit all of the determined plurality of bearers includes determining whether resources are available for the determined plurality of bearers and, in response to determining that resources are available for all of the determined plurality of bearers, determining to admit all of the plurality of bearers. According to one embodiment of this aspect, the bearer message includes at least one service level Allocation and Retention Priority, ARP, parameter for the service. The at least one service level ARP parameter identifies an importance of the service compared to at least one other service. A determination is made that resources are unavailable for at least one of the determined plurality of bearers. A determination is made whether service level pre-emption is available for the service based on the at least one service level ARP parameter. If service level pre-emption is available, a determination is made whether at least one other service can be preempted. In response to determining that at least one other service can be preempted, resources associated with the other service are caused to be released. The released resources are allocated to the at least one of the determined plurality of bearers.

According to one embodiment of this aspect, the at least one service level ARP parameter includes at least one of a priority level parameter, a service pre-emption capability parameter and a service pre-emption vulnerability parameter. The priority level parameter indicates a priority of allocation and retention for the service. The service pre-emption capability parameter indicates the pre-emption capability of the request service on other services. The service pre-emption vulnerability parameter indicates vulnerability of the service to pre-emption by other services.

According to one embodiment of this aspect, the determined at least one other service that is preempted is associated with a service pre-emption vulnerability parameter that allows pre-emption and an ARP priority level parameter of the other service indicates a lower priority than the ARP priority level of the service.

According to one embodiment of this aspect, in response to determining that no other service can be preempted, at least one service that allows for bearer level pre-emption is determined. In response to determining at least one service that allows for bearer level pre-emption, bearer level pre-emption is performed to preempt at least one bearer associated with the at least one service that allows for bearer level pre-emption.

According to one embodiment of this aspect, the bearer message includes a service profile identifier, ID. The determining of the plurality of bearers required to support the service is based at least in part on the service profile ID. According to one embodiment of this aspect, a bearer modification request is received. The modification to the service is one of allowed and rejected based at least in part on whether the service, as modified, would meet a quality of service requirement for the service. According to one embodiment of this aspect, a determination is made whether to terminate at least one bearer for the service. In response to determining to terminate the at least one bearer, the plurality of bearers associated with the service are determined based at least in part on the service profile ID. All bearers associated with the service are terminated.

According to one embodiment of this aspect, the determining whether to terminate at least one bearer for the service includes determining at least one of service termination and admission rejection during service modification has occurred. According to one embodiment of this aspect, the bearer message includes at least one bearer level Allocation and Retention Priority, ARP, parameter. A service profile identifier, ID, associated with the service is determined based at least in part on the at least one bearer level ARP parameter. The determining of the plurality of bearers required to support the service is based at least in part on the service profile ID.

According to another embodiment of the disclosure, a base station for performing admission control at a service level is provided. The base station includes a message receiving module configured to receive a bearer message for a service. The base station includes a bearer determining module configured to, in response to receiving the bearer message, determine a plurality of bearers required to support the service. The base station includes an admission control module configured to determine whether to admit all of the determined plurality of bearers, and in response to determining to admit all of the determined plurality of bearers, admit the service with all of the determined plurality of bearers.

According to another embodiment of the disclosure, a computer readable storage medium is provided. The computer readable storage medium stores executable instructions for performing admission control at a service level, which when executed by a processor, causes the processor to receive a bearer message for a service, and in response to receiving the bearer message, determine a plurality of bearers required to support the service. The processor is further caused to determine whether to admit all of the determined plurality of bearers, and in response to determining to admit all of the determined plurality of bearers, admit the service with all of the determined plurality of bearers.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

The method, base station and system described herein advantageously provide service level admission control. In particular, decisions on whether to admit or reject a service take into account all bearers required by the service such that the service is admitted/rejected as a whole. Before describing in detail exemplary embodiments that are in accordance with the disclosure, it is noted that the embodiments reside primarily in combinations of apparatus components and processing steps related to providing service level admission control. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 1:
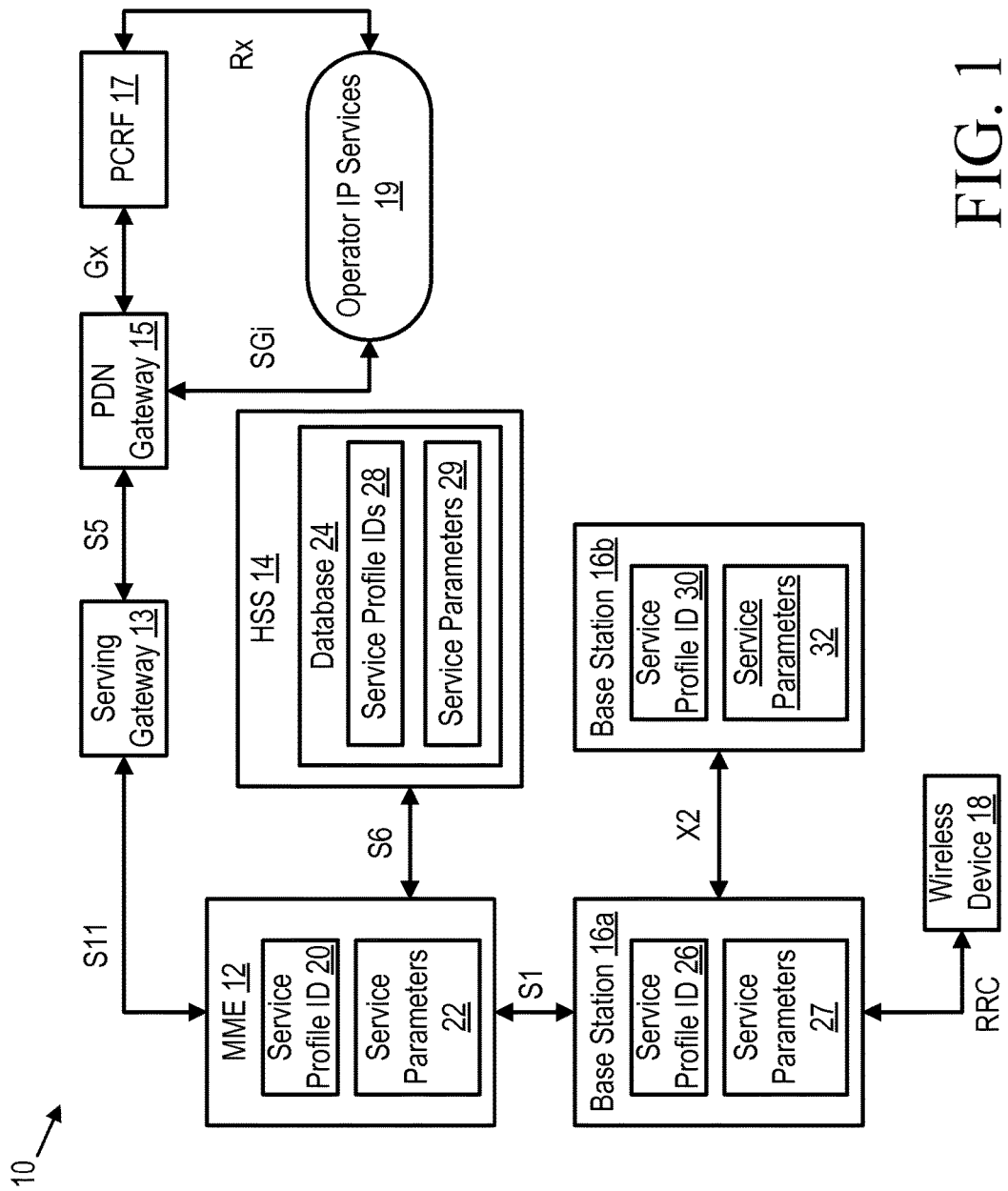
FIG. 1 is a block diagram of a portion of a wireless communication network constructed in accordance with the principles of the present disclosure.

Referring now to drawing figures in which like reference designators refer to like elements there is shown in FIG. 1 an exemplary system for service level admission control in accordance with the principles of the present disclosure and designated generally as "10." In particular, service level admission control uses the Long Term Evolution (LTE) Service Framework described in International Application No. PCT/IB2014/062276, titled "WIRELESS COMMUNICATION NETWORK BEARER MANAGEMENT", the entirety of all of which is incorporated by reference. This disclosure further provides admission control on a service level instead of a bearer level as described herein. However, before describing embodiments of the service level admission control process, components and other processes of system 10 will be described in detail with respect to FIG. 1 to provide a general understanding of bearer determination at the service level.

The wireless communication system 10 includes mobility management entity (MME) 12, serving gateway 13, HSS 14, packet data network (PDN) gateway 15, plurality of base stations 16a and 16b (base stations 16), policy control and charging rules function (PCRF) 17, one or more wireless devices 18 and operator's IP services 19. HSS 14 stores one or more service profile IDs 28 for system 10, service parameters 29 for system 10 and/or other data for configuring system 10, as discussed herein. Wireless device 18 can be any wireless device or user equipment (UE), including devices used for machine type communication, machine to machine communication, sensors, USB, wireless embedded device, laptop mounted devices, etc. The operator services 19 define the various services to be provided to a subscriber, and may be an Internet Protocol Multimedia Subsystem (IMS) network. In some embodiments, the IMS network may include the PCRF 17.

MME 12 stores one or more QoS class identifiers (QCIs), service profile identifiers 20 and/or service parameters 22. In some embodiments, the QCIs and/or service profile identifiers 20 and service parameters 22 of MME 12 are obtained from database 24 of HSS 14. In some embodiments, some service parameters 22 may arrive at MME 12 from serving gateway 13. In some embodiments, MME 12 only stores QCIs and/or service profile identifiers 20 and all service parameters 22 are stored at the base station 16. Thus, base stations 16 also store QCIs and service profile identifiers 26/30 and service parameters 27/32. The QCIs/service profile identifiers 26/30 and service parameters 27/32 are stored at base stations 16 may be obtained from MME 12 at a time of setup, modification, or deletion of a service, or may be pre-stored. Service profile identifier 20, 26 and 30 are collectively referred to as "service profile identifier" herein, and service parameters 22, 27 and 32 are collectively reference to as "service parameters" herein. In one embodiment, base station 16 can be an LTE evolved Node B (eNodeB).

MME 12 communicates with base station 16a over an S1 interface and communicates with HSS 14 over an S6 interface. Base station 16a communicates with wireless device 18 over the air interface and communicates with other base stations 16b over an interface, such as the X2 interface. Note that although the configuration of FIG. 1 is an LTE network, the inventive concepts and principles discussed herein apply to other wireless communication systems such as, for example, a Worldwide Interoperability for Microwave Access (WIMAX) network, a Universal Mobile Telecommunications System (UMTS) network or any other network or system where connections, calls, or bearers (bidirectional or otherwise) required for a service are not managed collectively, i.e., are managed individually.

In some modes of operation, service creation is triggered in one of several ways. For example, creation of a service with associated bearers may occur when wireless device 18 attaches to the network by, for example, initiating a call. During authentication of wireless device 18, MME 12 retrieves the subscriber profile from database 24 of HSS 14 via the S6 interface to authenticate the subscriber and determine if the subscriber is subscribed to the requested service.

Thus, when a subscriber attaches to the network, the subscriber at wireless device 18 may request a particular service that requires a plurality of bearers to carry the data and signaling required to establish and maintain the service. "Plurality of bearers" as used in this disclosure refers not only to a set of one or more bearers, but also to one or more bearers of different type(s) and/or used for one or more purposes. For example, a plurality of bearers can be used with a video service to define a "control" bearer used to exchange control information, a "sound" bearer used for sound information, and a "video" bearer used for video information. This request may be communicated to MME 12 via base station 16a. MME 12 obtains one or more QCIs and/or service profile identifier 20 for the requested service. The QCIs and/or service profile identifier 20 may be pre-stored at MME 12, obtained from HSS 14 or from serving gateway 13. MME 12 sends the QCIs alone or the QCIs and the service profile identifier 20 to base station 16a.

The QCIs and/or service profile identifier 20 may be communicated to base station 16a via an E-RAB setup message or an E-RAB modify message. When the E-RAB messages are used to communicate the QCIs/service profile identifier, optional parameters may also be included. These optional parameters are specific to the particular service and may, for example, include codec information. As an alternative to using E-RAB messages to communicate the QCIs/service profile identifier, the QCIs/service profile identifier may be sent in an S1AP message. For this purpose, two S1AP messages may be used: E-Service Setup and E-Service Modify. Each of these messages include service parameters 22 associated with the service. Thus, in one embodiment, an E-RAB message with respective service parameters is sent for each bearer associated with a service, and in another embodiment, a single message includes service parameters for all of the bearers supporting the service.

In some modes of operation, wireless 18 may already be attached to the network and may request, modify or terminate a service. If the service is Internet protocol multimedia subsystem (IMS)-based, an IMS node (which may include PCRF 17) may trigger service creation or modification. As is known by those of ordinary skill in the art, the IMS is a network that supports service management such as support for creation, deletion and modification of a service.

When a service is created, policy control and charging rules function (PCRF) 17 transmits QCIs/service profile identifier on the Gx interface to packet data network (PDN) gateway 15. PDN gateway 15 forwards the QCIs/service profile identifier to serving gateway 13 on the S5 interface. Serving gateway 13 forwards the QCIs/service profile identifier to MME 12 via the S11 interface. MME 12 then forwards the QCIs/service profile identifier to base station 16a on the S1 interface. In addition to the service profile identifier, service parameters are also transmitted from PCRF 17 to base station 16a via of PDN gateway 15 and serving gateway 13.

As noted, in some embodiments, a service profile identifier is sent from MME 12 to base station 16, which correlates the service profile identifier to service parameters. Table 1 shows the contents of an exemplary QoS message or information element (IE) used to convey the service profile identifier from one of PCRF 17, PDN gateway 15, serving gateway 13 or MME 12, ultimately destined for base station 16. A QCI is contained in Octet 6 and is omitted in some embodiments. Octets 27-28 include the service profile identifier and octets 29-44 contain service parameters for the bearer. Octets 33-36 contain the resolution of a service if applicable, octets 37-40 contain the frame rate of a service if applicable and octets 41-56 contain the bit rate parameters for the bearer. Note that in some embodiments, the service profile identifier is sent without any service parameters. In these embodiments, the base station relies on a table stored at the base station that correlates the service profile identifier with the service configuration parameters sufficient to configure all the bearers in support of the service.

TABLE 1

| Octets | Bits | | | | | | | |
|---|---|---|---|---|---|---|---|---|
| | 8 | 7 | 6 | 5 | 4 | 3 | 2 | 1 |
| 1 | Type = 80 (decimal) | | | | | | | |
| 2-3 | Length = n | | | | | | | |
| 4 | Spare | | | | Instance | | | |
| 5 | Spare | PCI | | PL | | | Spare | PVI |
| 6 | Label (QCI) | | | | | | | |
| 7-11 | Maximum bit rate for uplink | | | | | | | |
| 12-16 | Maximum bit rate for downlink | | | | | | | |
| 17-21 | Guaranteed bit rate for uplink | | | | | | | |
| 22-26 | Guaranteed bit rate for downlink | | | | | | | |
| 27-28 | Service Profile Identifier | | | | | | | |
| 29-30 | Codec Identifier for uplink | | | | | | | |
| 31-32 | Codec Identifier for downlink | | | | | | | |
| 33-34 | Resolution for uplink | | | | | | | |
| 35-36 | Resolution for downlink | | | | | | | |
| 37-38 | FrameRate for uplink | | | | | | | |
| 39-40 | FrameRate for downlink | | | | | | | |
| 41-44 | Minimum bit rate for uplink | | | | | | | |
| 45-48 | Minimum bit rate for downlink | | | | | | | |
| 49-52 | Codec Bit Rate List for uplink | | | | | | | |
| 53-56 | Codec Bit Rate List for downlink | | | | | | | |
| 57 to (n + 4) | These octet(s) is/are present only if explicitly specified | | | | | | | |

The bearer QoS message of Table 1 may be included in: a create bearer request message, an update bearer request message, a create session request message, a create session response message, a forward relocation request message, a context response message, a multimedia broadcast and multicast service (MBMS) session start request message and an MBMS session update request message.

Table 2 is an alternative example of information communicated in a message that carries a service profile identifier from MME 12 to base station 16a. In particular, Table 2 includes Service Level Allocation and Retention Priority (ARP) parameters that can be used by base station 16 to perform service level pre-emption as described herein.

TABLE 2

| IE/Group Name | Presence | Range | IE type and reference | Semantics description |
|---|---|---|---|---|
| Service Level Parameters | | | | |
| > Service Profile Identifier | M | | INTEGER (0 . . . 65535) | This parameter identifies the service so that nodes can expand it into or retrieve a set of service parameters. |
| > Service Level Allocation and Retention Priority | M | | See Table 3 | This IE identifies the relative importance compared to other services for allocation and retention of the E-UTRAN service. |

TABLE 3

| IE/Group Name | Presence | Range | IE type and reference | Semantics description |
|---|---|---|---|---|
| Service Level Allocation and Retention Priority | | | | |
| > Priority Level | M | | INTEGER (0 . . . 15) | This parameter identifies the priority of Allocation and Retention for a service. |
| > Service Pre-emption Capability | M | | ENUM (shall not trigger pre-emption, may trigger pre-emption) | This IE identifies the pre-emption capability of the request on other services. |
| > Service Pre-emption Vulnerability | M | | ENUM (service level not pre-emptable, bearer level pre-emptable, service level pre-emptable) | This IE indicates the vulnerability of the service to pre-emption by other services. |

In the examples discussed herein, the "M" indicates that the field is mandatory. IE refers to an information element. When the service profile identifier is received by base station 16a, base station 16a maps the service profile identifier to a set of service parameters. In the case of handover of the wireless device from base station 16a to base station 16b, at least a service level identifier is sent from base station 16a to base station 16b on the X2 interface.

Some of the services that may be associated with a set of service parameters include voice over long term evolution Table 4 provides an exemplary description of services identified by the service profile identifier and bearer profile identifiers for each service. Further, Table 4 includes Service Level ARP parameters that allow system 10 to determine the relative importance of a requested service when compared to other services. It is understood that service profile identifiers can be associated with any manner of bearer profile IDs. In Table 4, "Bearer correlated" indicates whether two or more bearers depend one from another, such that removing one would cause removal of the other.

TABLE 4

| Service profile ID | Description | Service Level Allocation and Retention Priority (Service Level ARP) Parameters | Bearer Correlated | Bearer Profile ID (BPID) |
|---|---|---|---|---|
| 0 | Default | {14, shall not trigger pre-emption, service level not pre-emptable} | | |
| 1 | VoLTE-Service | {1, may trigger pre-emption, service level pre-emptable} | No<br>Yes | Voice = BPID 1<br>Signal = BPID 2 |
| 2 | IMS Video service | {2, may trigger pre-emption, bearer level pre-emptable} | Yes, to sound<br>Yes, to sound<br>Yes, to video<br>Yes, to video<br>Yes, to all | DL Video = BPID 3<br>UL Video = BPID 3<br>DL Sound = BPID 5<br>UL Sound = BPID 5<br>Signal = BPID 6 |
| 3 | VoIP over Best Effort | {6, may trigger pre-emption, service level pre-emptable} | No<br>Yes | Voice = BPID 7<br>Signal = BPID 8 |
| ...<br>255<br>...<br>65535 | | | | |

(VoLTE) service, an Internet Protocol Multimedia Subsystem (IMS) video service, a voice over Internet (VoIP) best effort service, and a video best effort service. In one embodiment, the service profile identifier is an unsigned 32 bit field which indicates the service to which the specific information refers. More specifically, the service profile identifier is used by the base station to retrieve the service parameters for admitting or rejecting the service. In one embodiment, the service profile identifier originates at PCRF 17 and is transmitted to PDN 15 via the Gx interface. In one embodiment, PDN 15 forwards the service profile identifier to serving gateway 13 via the S5 interface. In one embodiment, serving gateway 13 forwards the service profile identifier to MME 12 via the S11 interface.

In some embodiments, rather than transmit a service profile identifier to base station 16a, at least one QoS class identifier (QCI) associated with the service is sent from MME 12 to the base station 16a. In this case, base station 16 can use the QCIs to determine the set of service parameters. For example, one or more QCIs may be sent via one or more E-RAB messages. Base station 16a determines a service profile identifier based on the received at least one QCI from a table stored at base station 16a as discussed in detail below. The determined service profile identifier identifies a requested service and is associated with a set of service parameters.

Each bearer profile identifier may be associated with one or more codecs and bitrates to be applied to bearers associated with the service. Thus, a service profile identifier may specify a bearer profile for each bearer associated with the service, and the bearer profile may specify a codec to be applied to the bearer.

In some embodiments, one or more QCIs are received at the base station 16 from MME 12 via a variety of different types of messages such as E-RAB messages, and are correlated to determine a service profile identifier. Each QCI is associated with a particular bearer, or one QCI is associated with the service as a whole. When the one or more QCIs are received at the base station, the base station correlates the QCIs with a service profile identifier. The service profile identifier identifies a service and is associated with a bearer profile in Table 4.

Thus, in some embodiments, the service profile identifier, rather than the QCI, is received at base station 16 from MME 12 in a message. Base station 16 correlates the received service profile identifier with the service parameters. In other embodiments, at least one QCI is received at base station 16 from MME 12. Base station 16 correlates the received at least one QCI with a service profile identifier. The service profile identifier is correlated with a bearer profile in Table 4.

Figure 2:
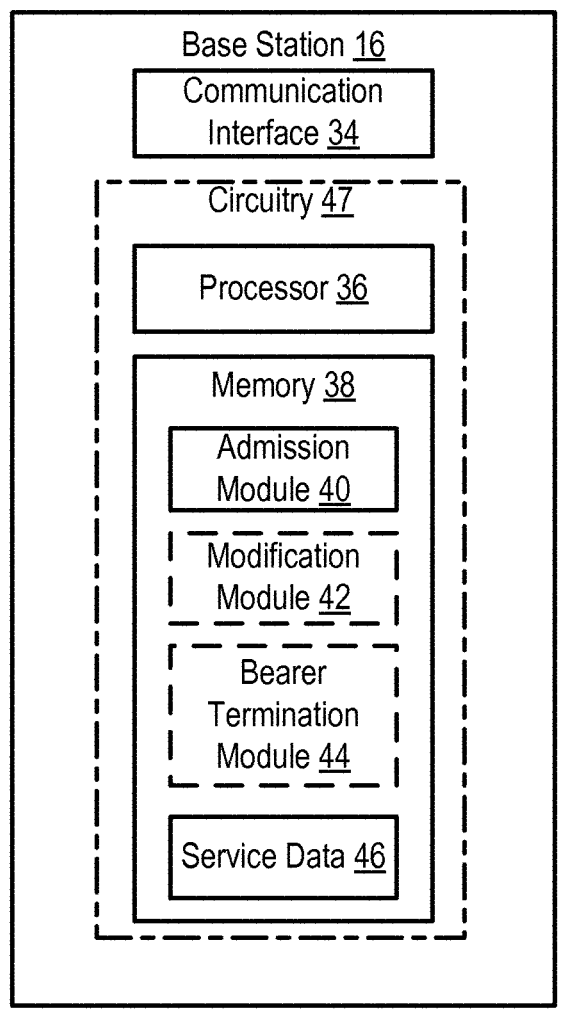
FIG. 2 is a block diagram of an exemplary base station for performing service level admission control constructed in accordance with the principles of the present disclosure.

Turning now to FIG. 2, there is illustrated a block diagram of one embodiment of base station 16. Base station 16 includes communication interface 36 for transmitting and receiving communications. Base station 16 includes processor 36 for performing base station 16 functionality as described herein. Base station 16 includes memory 38 that is configured to store data and/or one or more modules. Memory 38 may include non-volatile and/or volatile memory. For example, non-volatile memory may include a hard drive, flash memory, programmable integrated circuits, memory stick, solid state memory and the like. Also, volatile memory may include random access memory and others known in the art. Memory 38 stores program instructions such as those for admission module 40. For example, admission module 40 includes instructions, which when executed by processor 36, causes processor 36 to perform the service level admission control process, as discussed in detail with respect to FIG. 4. In another embodiment, admission module 40 includes instructions, which when executed by processor 36, that cause processor 36 to perform the service level admission control process as discussed in detail with respect to FIG. 5. In yet another embodiment, admission module 40 includes instruction, which when executed by processor 36, causes processor 36 to perform the service level admission control process as discussed in detail with respect to FIG. 7.

Memory 38 also stores program instructions such as those for modification module 42. Modification module 42 includes instructions, which when executed by processor 36, causes processor 36 to perform the service level modification process as discussed in detail with respect to FIG. 8. Memory 38 also stores program instructions such as those for bearer termination module 44. Bearer termination module 44 includes instructions, which when executed by processor 36, causes processor 36 to perform the bearer termination process as discussed in detail with respect to FIG. 9. In one or more embodiments, one or more of admission module 40, modification module 42 and bearer termination module 44 may be omitted from memory 38 of base station 16 based on design need in case base station is not configured to perform certain functionality described herein. Optional modules are denoted in FIG. 2 in dashed lines. Alternatively, functionality of one or more of admission module 40, modification module 42 and bearer termination module 44 may be performed in one or more other devices and/or apparatus, or in a distributed manner based on design need. In other words, the elements shown in dashed lines can be performed in a distributed manner across other network devices. Memory 38 also stores service data 46. Service data 46 includes one or more of QCIs, service parameters and/or table(s) discussed herein. In one or more other embodiments, processor 36 and memory 38 form circuitry 47 containing instructions which, when executed cause base station 16 to perform service level admission control described herein.

Figure 3:
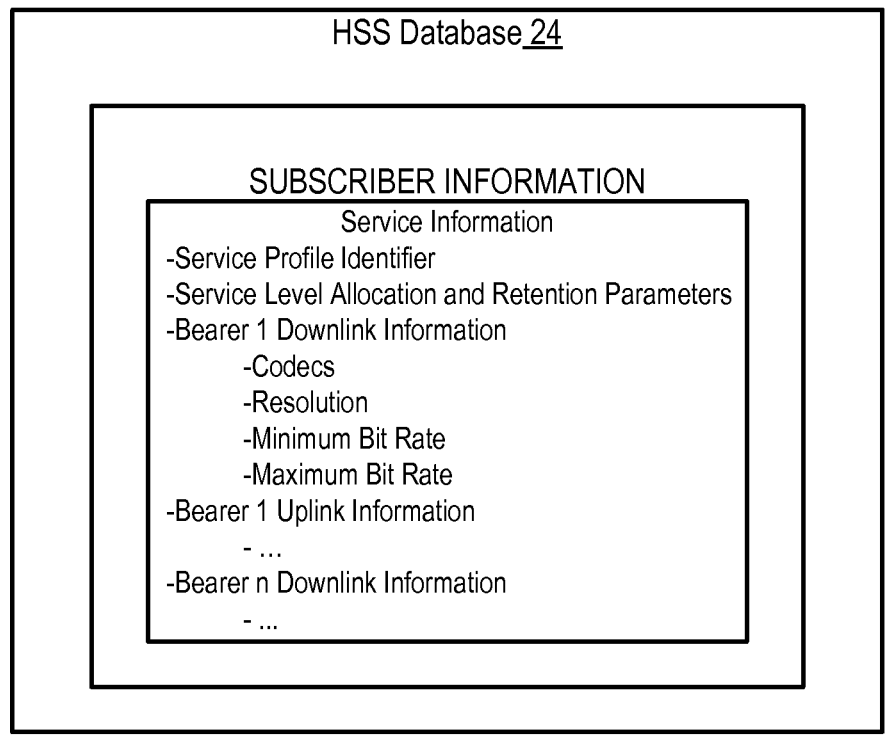
FIG. 3 is a block diagram of an exemplary HSS database constructed in accordance with principles of the present disclosure.

A block diagram of exemplary HSS database 24 is described with reference to FIG. 3. Database 24 organizes the different services for each of a plurality of subscribers according to service profile identifiers, APR parameters and bearers, as shown in FIG. 3. In particular, database 24 includes service level ARP parameters that allow system 10 to determine the relative importance of a requested service when compared to other services. Thus, database 24 may specify what services are provided to each subscriber of multiple subscribers, and may specify the parameters for each service for each subscriber.

Figure 4:
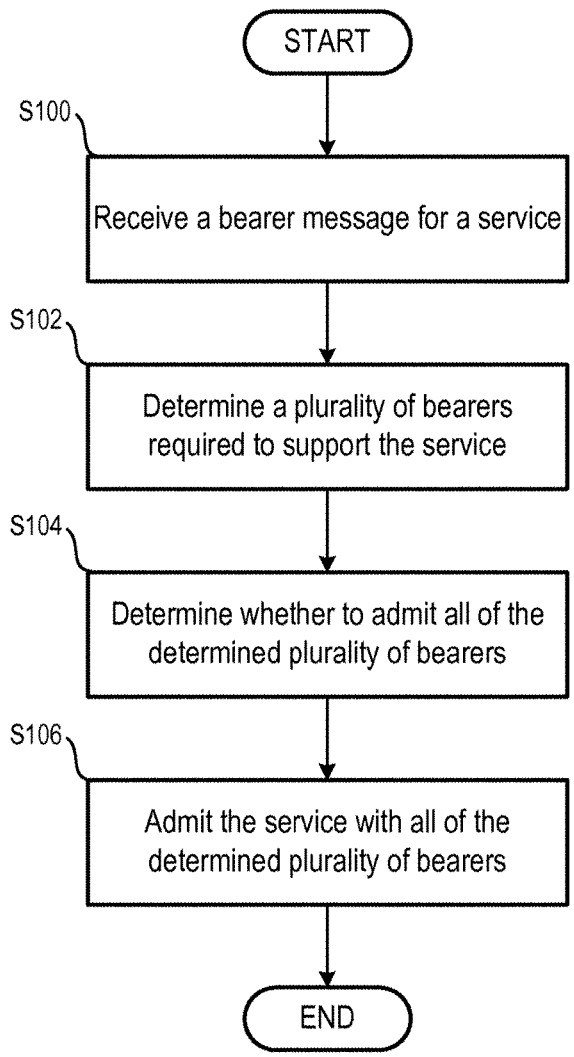
FIG. 4 is a flowchart of an exemplary admission control process in accordance with the principles of the present disclosure.

Turning now to the service level admission control process of the disclosure, there is illustrated in FIG. 4 a flow diagram of an exemplary service level admission control process of admission module 40. Processor 36 receives a bearer message for a service (Block S100). In one or more embodiments, a bearer message is one of an S1AP E-Service and S1AP E-RAB message. In such embodiments, the S1AP E-Service message is one of an E-Service Setup message, an E-Service Modify message and E-Service Release message. Also in such embodiments, the S1AP E-RAB message is one of an E-RAB Setup message, an E-RAB Modify message and an Initial Context Message.

For example, base station 16 receives an E-RAB setup message that includes at least one identification parameter for identifying the service to be set up. In one or more embodiments, the at least one identification parameter includes a service profile identifier and bearer level ARP parameters (as defined in 3GPP TS 36.413 version 12.3.0). In one or more other embodiments, the at least one identification parameter includes the bearer level ARP but not a service profile identifier. The bearer message may be for service creation due to mobility. In other words, in some embodiments, service level admission control and pre-emption described herein can occur at the receiving of one of the following messages: (1) S1AP E-Service messages: E-Service Setup message, E-Service Modify message, E-Service Release message (as defined in International Application No. PCT/IB2014/062276 referenced above); (2) S1AP E-RAB messages: E-RAB Setup message, E-RAB Modify message, Initial Context Message (modified S1AP message, with new Service Profile ID as defined in International Application No. PCT/IB2014/062276 reference above); and (3) Existing S1AP E-RAB messages (as defined in 3GPP TS 36.413 v 12.3.0 reference above, without Service Profile ID). In the latter case, the QCI for the bearer can be used to determine the service profile ID by retrieving the local eNB QCI/Service configuration table (with QCI and service profile ID mapping). As noted, exemplary definitions of many of the above-listed S1AP E-Service and S1AP E-RAB messages are known and are beyond the scope of this disclosure.

Processor 36 determines which bearers, i.e., plurality of bearers, are required to support the service (Block S102). In one or more embodiments, processor 36 determines the plurality of bearers required to support a requested service based on information in the received bearer message. For example, the bearer message includes a list of E-RABs to be setup for the required service or a list of E-RABs associated with the requested service that processor 36 uses to determine the plurality of bearers required to support the requested service. In another example, the bearer message includes QCI in which processor 36 inspects the QCI in the request to determine the service profile identifier corresponding to the QCI in the request. Processor 36 then uses the determined service profile identifier to determine the anticipated E-RAB(s) for the requested service such as by checking the local base station 16 QoS configuration.

In one or more other embodiments, processor 36 determines the plurality of bearers required to support a requested service based on the service profile identifier. For example, processor 36 determines the plurality of bearers required to support the requested service by inspecting the service profile identifier to determine associated QCI(s) and anticipated E-RAB(s) for the required service. In one or more embodiments, processor 36 matches the received service profile identifier with a service profile identifier in Table 4 to determine the plurality of bearers required to support the requested service. In other words, service level admission control allows for flexibility in how the bearers for service are determined.

Processor 36 determines whether to admit all bearers of the determined plurality of bearers (Block S104). For example, processor 36 determines whether resources are available to support the service in which processor 36 may perform service level pre-emption if at least one bearer is not admitted, as discussed in detail with respect to FIGS. 5, 6 and 7. Processor 36, in response to determining to admit all of the determined plurality of bearers, admits the service with all of the determined plurality of bearers (Block S106). If processor 36 determines that all bearers of the determined plurality of bearers cannot be supported, processor 36 denies the service and removes all resources associated with the service, as discussed in detail with respect to FIGS. 5 and 7.

The base station 16 advantageously performs admission control at the service level and not the bearer level, thereby preventing a requested service from being partially admitted when only some of the bearers associated with the service are admitted but the rest of the bearers fail to be admitted. In other words, if a bearer of a specific service cannot be admitted such as due to congestion or due to unsuccessful pre-emption, all bearers that are part of the service are rejected, i.e., base station 16 releases the resources for the requested service. Therefore, while 3GPP 36.413 version 12.3.0 defines the admission control at the bearer level, 3GPP TS 36.413 version 12.3.0 disadvantageously takes several admission control passes to admit a multi-bearer service in which one bearer for a service is admitted in one admission control pass but another bearer for the service may not be admitted in another admission control pass. 3GPP TS 36.413 version 12.3.0 disadvantageously ties up bearers in certain situations such as when a service is partially admitted, while the service level admission control process described herein admits or rejects all bearers at the same time in order to avoid fragmented service creation.

Figure 5:
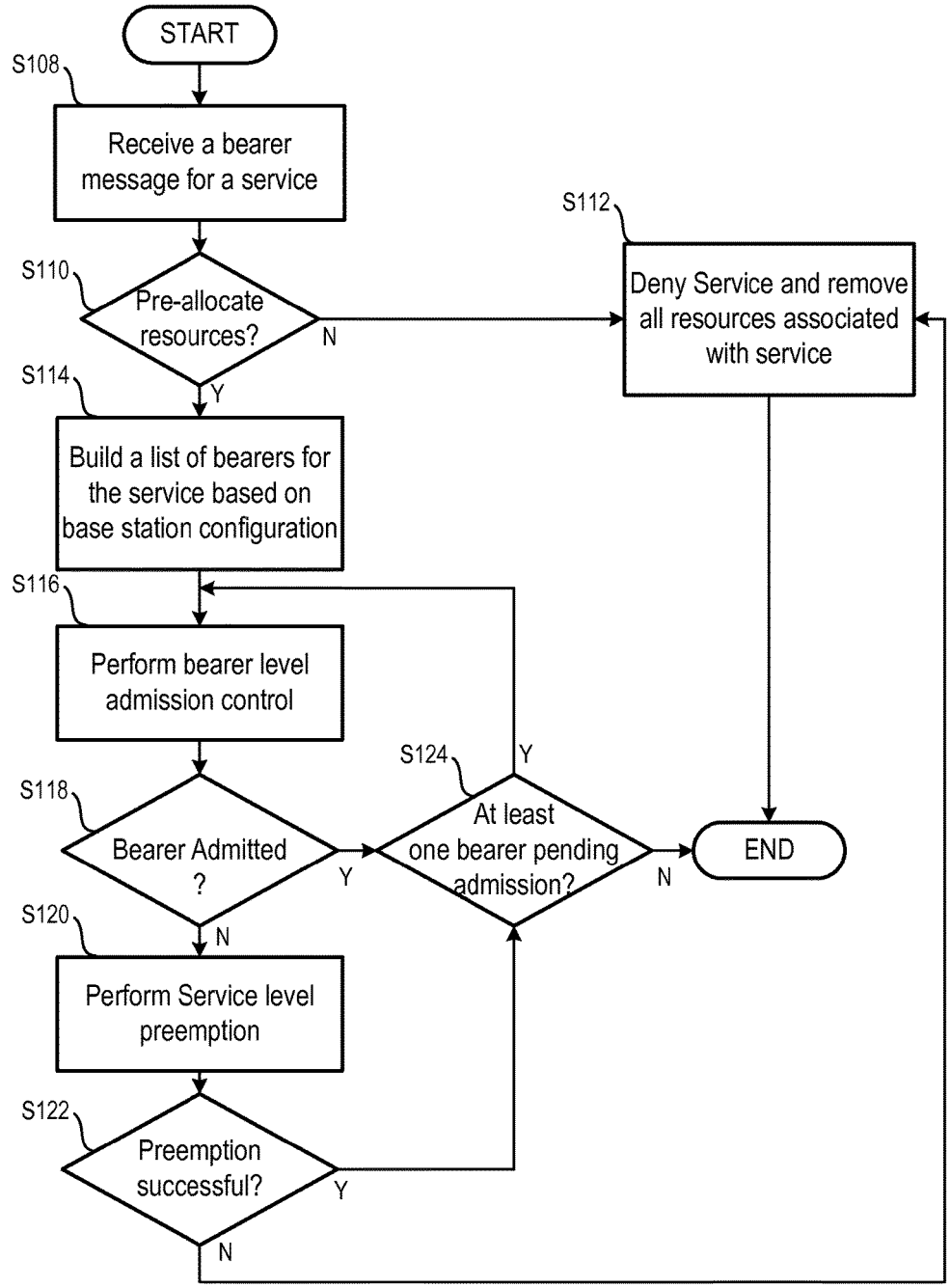
FIG. 5 is a flowchart of another embodiment of the exemplary admission control process in accordance with the principles of the present disclosure.

A flow diagram of another embodiment of the exemplary service level admission control process of FIG. 4 is discussed in detail with reference to FIG. 5. The process described in FIG. 5 relates to a process where base station 16 relies on service parameters defined locally in the base station QoS configuration to perform service level admission control. Processor 36 receives a bearer message for a service, as discussed in Block S100 (Block S108). In this embodiment, the bearer message does not include a service profile identifier. Processor 36 determines whether to pre-allocate resources for all bearers (Block S110). If processor 36 determines not to pre-allocate resources, processor 36 denies the service and removes all resources associated with the service, if any (Block S112).

Referring back to Block S110, if processor 36 determines to pre-allocate resources, processor 36 builds a list of bearers for the service based on base station configuration (Block S114). In one or more embodiments, processor 36 builds or determines a list of bearers for the service based on QCI(s) in the bearer message. Using the QCI, processor 36 is able to determine the service profile identifier, as discussed above. For example, base station 16 may store one or more tables such as Table 5, illustrated below, that associates a respective QCI with a service profile identifier such that processor 36 can use the QCI to determine the corresponding service profile identifier. Therefore, processor 36 inspects the QCI in the bearer message to determine the service profile to the QCI and anticipated E-RAB for the service by checking base station 16 configuration, e.g., local base station 16 QoS configuration.

TABLE 5

| QCI | Description | Priority | ... | Service-profile-ID | ... |
|---|---|---|---|---|---|
| 1 | Standardized | Existing field | | ID in range [0 ... 65535] | |
| ... | Standardized | Existing field | | ID in range [0 ... 65535] | |
| 9 | Standardized | Existing field | | ID in range [0 ... 65535] | |
| 10 | Operator's | Existing field | | ID in range [0 ... 65535] | |
| ... | Operator's | Existing field | | ID in range [0 ... 65535] | |
| 255 | Operator's | Existing field | | ID in range [0 ... 65535] | |

In one or more embodiments, an operator can configure the service level Allocation and Retention Priority (ARP) parameters in the service profile table, i.e., Table 4, locally in the local QoS configuration of base station 16. Processor 36 may determine the service level ARP parameters based on the determined service profile identifier that was itself determined, by processor 36, based on the QCI. Therefore, if service level ARP parameters or the serviced profile identifier is not conveyed from the core network over the S1 interface at initial context setup, E-RAB setup/modify messages or over X2 interfaces at handover, base station 16 may uses the locally configured service level ARP parameters in Table 4 for service level pre-emption, as discussed below.

Processor 36 performs bearer level admission control process for one of the plurality of bearers required for the service as discussed in 3GPP (Block S116). Processor 36 determines whether the bearer was admitted by the bearer level admission control process (Block S118). For example, due to congestion, processor 36 may determine that there are no bearers available such that the bearer for the requested service was not admitted. In another example, processor 36 may determine that the bearer was admitted such as if there was an available bearer for the requested service. There may be other situations during which a bearer for the requested service is admitted or rejected (not admitted) during the bearer level admission control process.

Figure 6:
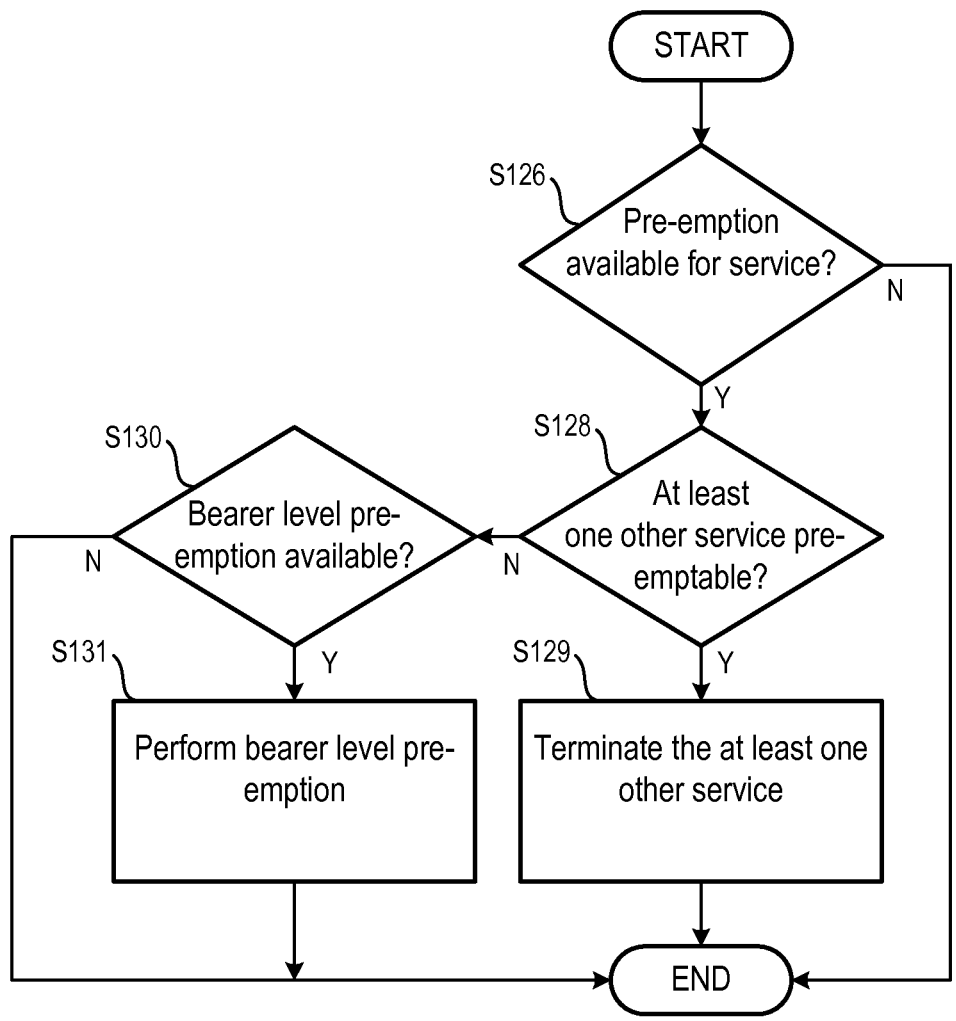
FIG. 6 is a flowchart of an exemplary service level pre-emption process in accordance with the principles of the present disclosure.

If processor 36 determines that the bearer was not admitted, processor 36 performs the service level pre-emption process as discussed in detail with respect to FIG. 6 (Block S120). After performing the service level pre-emption process, processor 36 determines whether service level pre-emption was successful (Block S122). For example, successful service level pre-emption may correspond to processor 36 being able to release resources, e.g., one or more bearers, for use by the requested service such that the bearer for the requested service is admitted. If processor 36 determines that pre-emption was not successful, processor 36 denies the requested service and removes all resources associated with the service as discussed above with respect to Block S112.

However, if processor 36 determines that pre-emption was successful such that the bearer for the requested service was admitted, processor 36 determines whether at least one bearer is pending admission (Block S124). For example, assuming the service is VoLTE-Service illustrated in Table 4, a bearer for voice corresponding to BPID 1 may be admitted but a bearer for the signal corresponding to BPID 2 is pending admission or has not yet been admitted. If processor 36 determines that at least one other bearer is pending admission, processor 36 performs Block S116 with respect to the other bearer that is pending admission. In other words, processor 36 repeats one or more of Blocks S116-S124 until all bearers required for the service have been admitted, or until one bearer is determined to not be allowed admission in which case processor 36 performs Block S112, as discussed above. Referring back to Block S124, if processor 36 determines that at least one other bearer for the service is not pending admission, i.e., all bearers for the requested service have been admitted, the process of FIG. 5 may end.

A flow diagram of an exemplary service level pre-emption process of the disclosure is discussed with reference to FIG. 6. In particular, the service level pre-emption process uses new service level ARP parameters that have been added to Table 4, as discussed in this disclosure, in order to advantageously allow admission control of system 10 to take into account all bearers required by the requested service and to compare service requirements to the current cell/node resource utilization. This allows system 10 to make the decision to admit or reject the requested service as a whole, thereby avoiding partial admission or rejection of a requested service, which waste resources as a partially admitted service will not function properly, if at all, may still have at least one resources/bearers reserved for the non-functioning service.

Processor 36 determines whether pre-emption is available for the requested service (Block S126). For example, processor 36 determines whether pre-emption is available for the service associated with the determined service profile identifier corresponding to service level ARP parameters defined in base station 16's QoS configuration, i.e., Table 4. Service level ARP parameters identify the relative importance of the requested service compared to other services such that less important services may terminated in order to free up resources, e.g., one or more bearers associated with the less important service. In one example, a service level ARP parameter such as Service Pre-emption Capability may indicate the requested service is not allowed to trigger pre-emption of other services, i.e., Service Pre-emption Capability="shall not trigger pre-emption". This may occur if the requested service corresponds to a "Default" service indicated in Table 4 that corresponds to service profile identifier "0". If pre-emption is not available for the requested service, the service level pre-emption process may end such that the service pre-emption was not successful.

However, if processor 36 determines that pre-emption is available for the requested service, processor 36 determines at least one other service that is pre-emptable (Block S128). In one or more embodiments, processor 36 may determine at least one other service that is pre-emptable by comparing service level ARP parameters associated with the requested service with service level ARP parameters associated with at least one other service. For example, processor 36 may search for pre-emptable services whose service pre-emption vulnerability, i.e., service level ARP parameter, is set to "service level re-emptable" and whose ARP priority level parameter, i.e., another service level ARP parameter, corresponds to a higher level than the requested service.

In one specific example, if the requested service corresponds to "VoLTE Service" having service level ARP parameters of {1, may trigger pre-emption, service level pre-emptable}, processor 36 may determine that a current service corresponding to "VoIP over Best Effort" having service level ARP parameters of {6, may trigger pre-emption, service level pre-emptable} is pre-emptable based on the comparison of service level ARP parameters. In particular, VoIP over Best Effort has a service level ARP parameter that allows for this service to be "service level pre-emptable" and a service level ARP parameter with a higher ARP priority level, i.e., 6, than the ARP priority level associated with "VoLTE Service", which is "1". In this embodiment, higher ARP priority levels correspond to "less important" services than lower ARP priority levels. Therefore, VoIP over Best Effort service may be pre-empted by a required VoLTE service according to one embodiment of the service level ARP parameters discussed herein.

While specific service level ARP parameters such as "priority level" and "service pre-emption vulnerability" have been discussed herein, one or more different service level ARP parameters that allow system 10 to determine the relative importance of a requested service when compared to other services may be used in accordance with this disclosure. However, if processor 36 determines that at least one other service is pre-emptable, processor 36 terminates the at least one other service in order to release resources, e.g., bearers, associated with the at least one other service (Block S129). Therefore, the service level ARP parameters discussed herein advantageously allow services to be compared to each other such that services of higher importance can be accommodated by releasing services of lesser importance.

Referring back to Block S128, if processor 36 determines no other service is pre-emptable, processor 36 determines whether bearer level pre-emption is available (Block S130). For example, processor 36 searches for less important services whose service pre-emption vulnerability is set to "bearer level pre-emptable", i.e., bearer level pre-emption allowed. In one or more embodiments, processor 36 performs bearer level pre-emption using bearer level ARP parameters, i.e., E-RAB ARP parameters, as is known the art if service level pre-emption is unsuccessful. If bearer level pre-emption is allowed, processor 36 performs bearer level pre-emption (Block S131). However, if bearer level pre-emption is not allowed, the service level pre-emption process of FIG. 6 may end such that the service level pre-emption was not successful.

Figure 7:
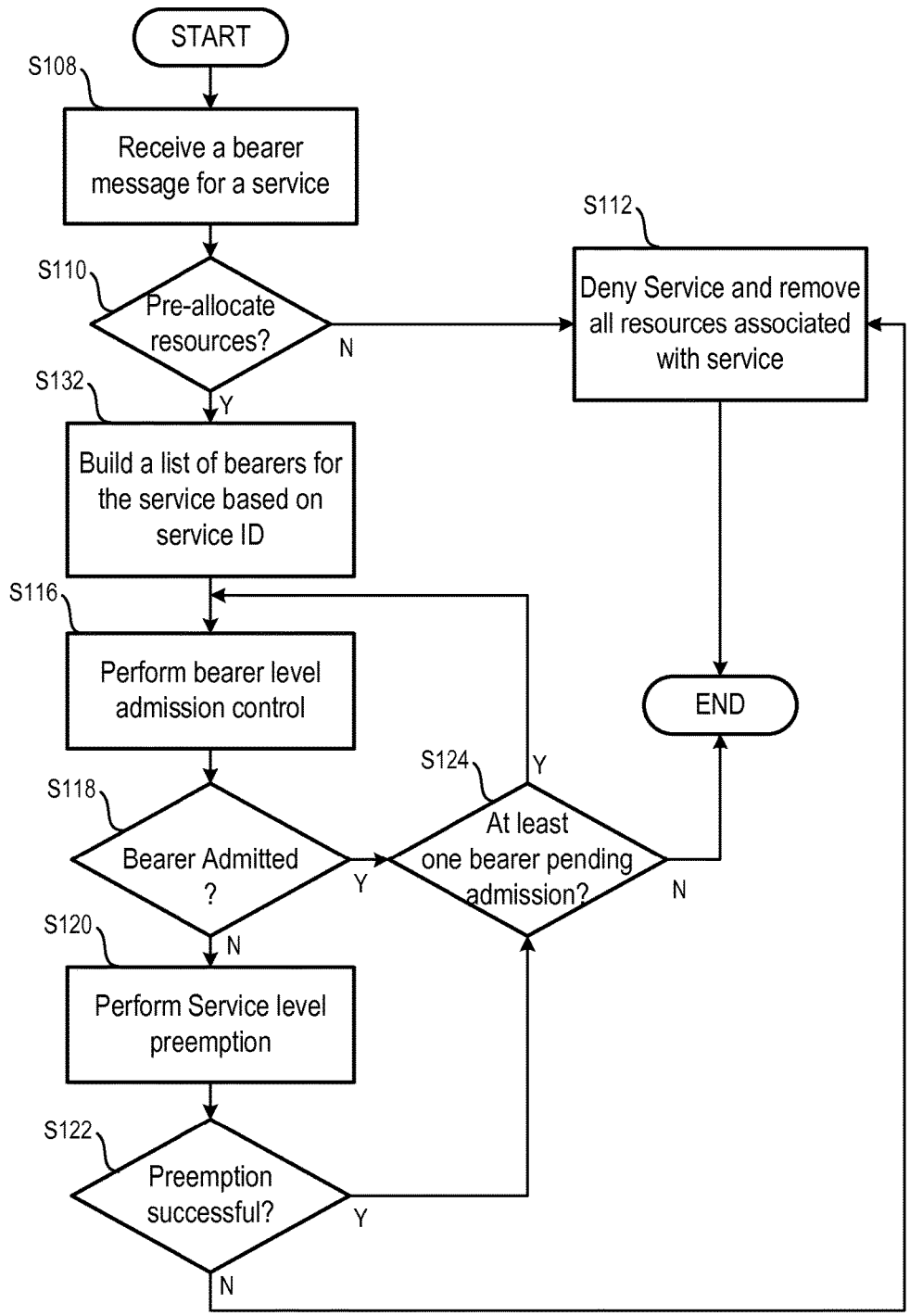
FIG. 7 is a flowchart of yet another embodiment of the exemplary admission control process in accordance with the principles of the present disclosure.

A flow diagram of another embodiment of the exemplary service level admission control process of FIG. 4 is discussed in detail with reference to FIG. 7. The blocks of FIG. 7 with the same reference designators as used in FIG. 5 provide the same general function in both processes. However, the process in FIG. 7 relates to the use of a service profile identifier that is received with the bearer message, i.e., information in the received bearer message is different, and the determination of Block S132 in FIG. 7 is different from the determination of Block S114 in FIG. 5 due the difference in received information in the two processes. Referring to Block S132, processor 36 builds a list of bearers for the requested service based on a service parameter received in the bearer message (Block S132). In one or more embodiment, a bearer message includes a service profile identifier and may include bearer level ARP parameters in which base station 16 inspects the received service profile identifier to determine the QCI and E-RAB associated with the requested service. Base station 16 checks the service level ARP parameters defined in Table 4 using the received service profile identifier. In one or more embodiments, service level pre-emption, i.e., Block S120, may be performed as early as the first E-RAB (default bearer) setup request such that service level pre-emption may not have to be performed for subsequent E-RABs for the same service as resources/bearers are available, i.e., the remaining bearers associated with the requested service will be admitted at Block S124. In one or more embodiments, processor 36 determines the QCI and E-RAB by using at least one of Tables 4 and 5.

In one or more embodiment, the bearer message may include service profile identifier, service level QoS parameters including service level ARP parameters and/or a list of E-RABs to be setup such that processor 36 determines whether pre-emption is available based on received service level ARP parameters. The bearer message may be received over the S1 interface at service setup or X2 interface at handover.

Figure 8:
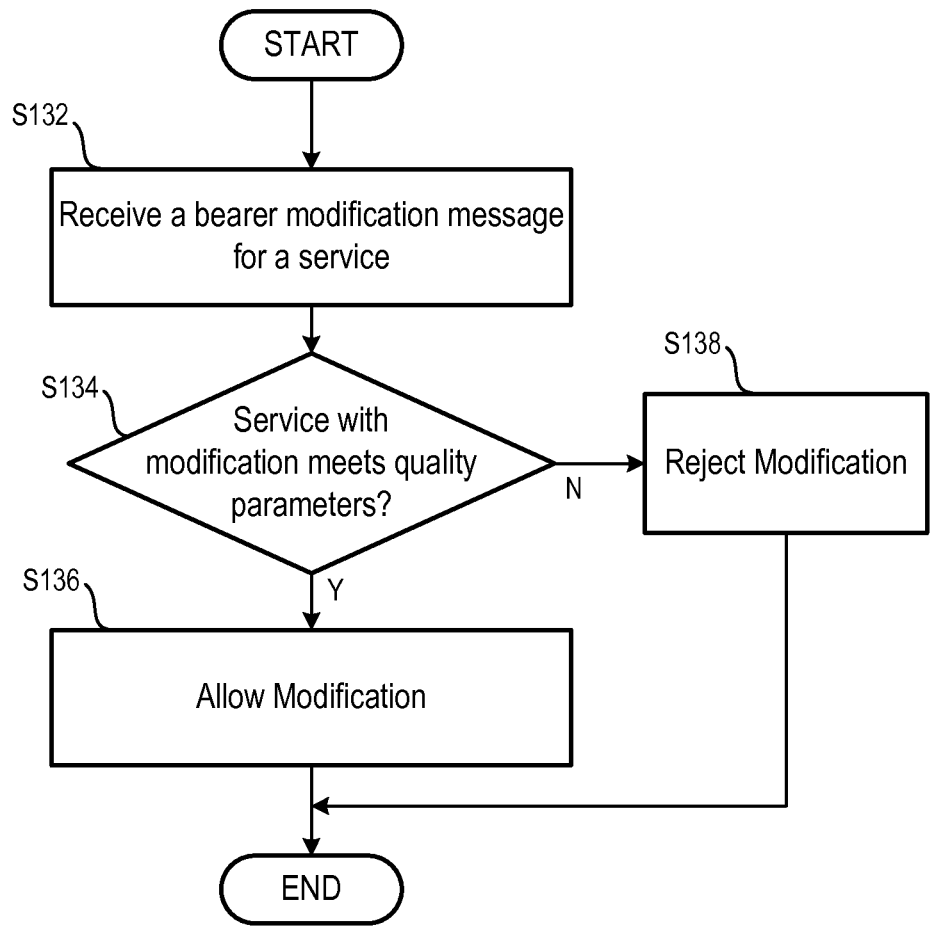
FIG. 8 is a flowchart of an exemplary modification process in accordance with the principles of the present disclosure.

A flow diagram of an exemplary service modification process of modification module 42 is discussed in detail with reference to FIG. 8. Processor 36 receives a modification message, e.g., bearer modification message, for a service (Block S133). For example, an E-RAB modify message, as defined in 3GPP TS 36.413 version 12.3.0, is received at base station 16 in which the E-RAB modify message includes at least one service parameter, e.g., QCI or service profile identifier, that identifies the service. The bearer message may be received over the S1 interface at service modification. In one or more embodiments, processor 36 determines the service profile identifier using Table 4. Processor 36 determines whether the service, as would be modified according to the modify message, meets quality parameters (Block S134). For example, processor 36 determines whether the QoS constraints defined for the service as a whole are still met. For example, for a modify request to reduce or increase some resources, the QoS requirements and constraints defined in the configuration data of the service as a whole needs to be respected to be successful. In addition, when extra resources are requested, the resources must be available for the modify request to succeed. If processor 36 determines that the service, as modified according to the modify message, meets the QoS constraints defined for the service as a whole, processor 36 allows the modification, i.e., modifies the service according to the modify message (Block S136). However, if processor 36 determines that the service, as modified according to the modify message, does not meet the QoS constraints defined for the service as a whole, processor 36 rejects the modification, i.e., does not modify the service according to the modify message (Block S138).

Figure 9:
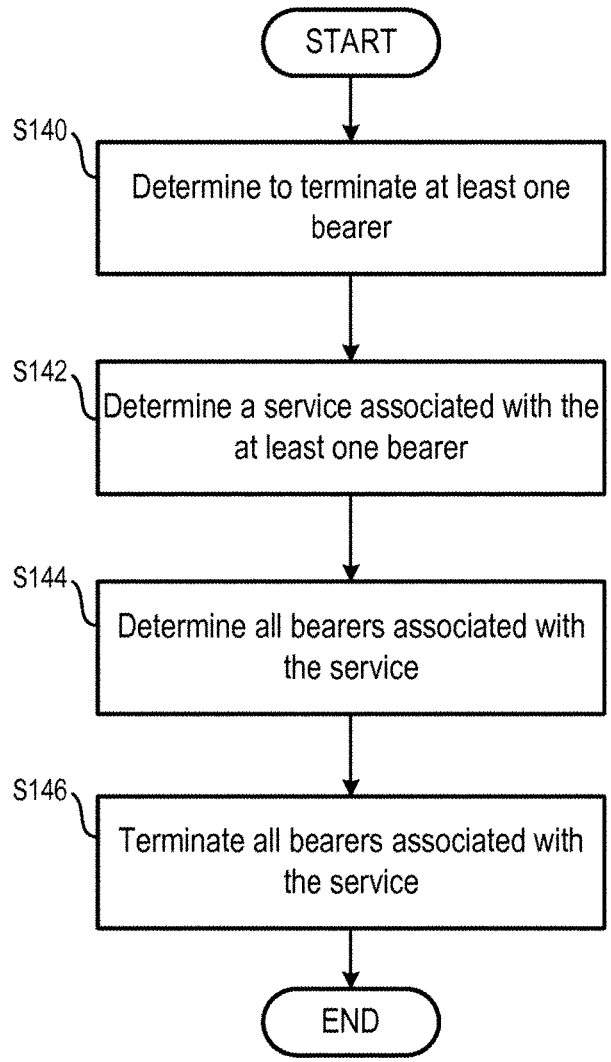
FIG. 9 is a flowchart of an exemplary bearer termination process in accordance with the principles of the present disclosure.

A flow diagram of an exemplary bearer termination process of bearer termination module 44 is discussed in detail with reference to FIG. 9. Processor 36 determines whether to terminate at least one bearer, i.e., release the at least one bearer (Block S140). For example, processor 36 determines that at least one bearer should be deleted due to service termination, admission rejection during modification or other reason. Processor 36 determines a service associated with the at least one bearer (Block S142). For example, processor 36 determines the service associated with the at least one bearer by searching Table 4 for a service/service profile identifier that corresponds to the at least one bearer to be terminated. Processor 36 determines all bearers associated with the service (Block S144). Processor 36 terminates all bearers associated with the service (Block S146). In the case where signaling of bearer deletion/termination is required for other modules or nodes, the bearers may be indicated as being deleted such as by having base station 16 mark/tag the bearers. In one example, the bearers being deleted are marked/tag as "deletion in progress" until the signal procedures are complete and it is safe to remove all the bearers associated with the service. Terminating bearer(s) from service that may otherwise be inoperable advantageously makes bearer(s) available for requested services.

Figure 10:
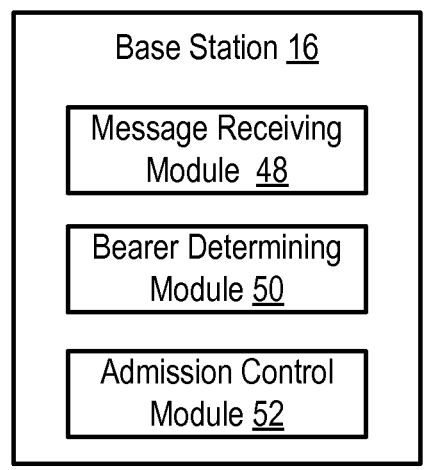
FIG. 10 is a block diagram of another embodiment of an exemplary base station constructed in accordance with the principles of the present disclosure.

A block diagram of another embodiment of base station 16 is discussed in detail with respect to FIG. 10. Base station 16 includes message receiving module 48 that is configured to receive a bearer message for service as discussed above with respect to Block S100. Base station 16 further includes bearer determining module 50 that is configured to, in response to receiving the bearer message, determine a plurality of bearers required to support the service as discussed in detail with respect to Block S102. Base station 16 further includes admission control module 52 that is configured to determine whether to admit all of the determined plurality of bearer, and in response to determining to admit all of the determined plurality of bearers, admit the service with all of the determined plurality of bearers as discussed in detail with respect to Blocks S104 and S106.

Embodiments described herein provide for service level admission control for a service that is identified by a service profile identifier. In some embodiments, the service profile identifier is sent from a network node, such as an MME, to a base station, such as a long term evolution (LTE) eNode B (eNB). The base station looks up the received service profile identifier from a table stored at the base station. The service profile identifier is associated in the table with a set of service parameters associated with the service. Some or all of the bearers may be bidirectional, being implemented in both the uplink and the downlink. In some embodiments, the MME sends one or more quality of service class identifiers (QCIs) to the base station, and the base station correlates the QCIs to a service profile identifier which is associated with a set of service parameters for associated with the service.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A base station for performing admission control at a service level, the base station comprising:
    a communication interface, the communication interface configured to receive a bearer message for a service;
    a processor, the processor configured to:
        in response to receiving the bearer message, determine a plurality of bearers required to support the service;
        determine, bearer by bearer, whether there are enough resources to support the plurality of bearers;
        if the determination is made that there are not enough resources to support a bearer of the plurality of bearers:
            release all reserved resources associated with the plurality of bearers; and
            deny the service; and
        if the determination is made that there are enough resources to support the plurality of bearers:
            admit the plurality of bearers; and
            admit the service.

2. The base station of claim 1, wherein the bearer message includes at least one service level Allocation and Retention Priority, ARP, parameter for the service, the at least one service level ARP parameter identifying an importance of the service compared to at least one other service; and
    the processor is further configured to:
        determine that there are not enough resources to support at least one of the determined plurality of bearers;
        determine whether service level pre-emption is available for the service based on the at least one service level ARP parameter;
        if service level pre-emption is available, determine whether at least one other service can be preempted;
        in response to determining that at least one other service can be preempted, cause resources associated with the other service to be released from the other service; and
        allocate the released resources to the at least one of the determined plurality of bearers.

3. The base station of claim 2, wherein the at least one service level ARP parameter includes at least one of a priority level parameter, a service pre-emption capability parameter and a service pre-emption vulnerability parameter;
    the priority level parameter indicating a priority of allocation and retention for the service;
    the service pre-emption capability parameter indicating the pre-emption capability of the service on other services; and
    the service pre-emption vulnerability parameter indicating vulnerability of the service to pre-emption by other services.

4. The base station of claim 3, wherein the determined at least one other service that is preempted is associated with a service pre-emption vulnerability parameter that allows pre-emption and an ARP priority level parameter of the other service indicates a lower priority than the ARP priority level of the service.

5. The base station of claim 2, wherein the processor is further configured to:
    in response to determining that at least one other service cannot be preempted, determine at least one service that allows for bearer level pre-emption;
    in response to determining at least one service that allows for bearer level pre-emption, perform bearer level pre-emption to preempt at least one bearer associated with the at least one service that allows for bearer level pre-emption.

6. The base station of claim 1, wherein the bearer message includes a service profile identifier, ID; and
    the determining of the plurality of bearers required to support the service being based at least in part on the service profile ID.

7. The base station of claim 6, wherein the processor is further configured to:

determine whether to terminate at least one bearer for the service;
in response to determining to terminate the at least one bearer, determine the plurality of bearers associated with the service based at least in part on the service ID; and
terminate all bearers associated with the service.

8. The base station of claim 7, wherein the determining whether to terminate at least one bearer for the service includes determining at least one of service termination and admission rejection during service modification has occurred.

9. The base station of claim 1, wherein the communication interface is further configured to receive a bearer modification request; and
the processor is further configured to one of allow and reject the modification to the service based at least in part on whether the service, as modified by the bearer modification request, would meet a quality of service requirement for the service.

10. The base station of claim 1, wherein the bearer message includes at least one bearer level Allocation and Retention Priority, ARP, parameter;
the processor is further configured to determine a service profile identifier, ID, associated with the service based at least in part on the at least one bearer level ARP parameter; and
the determining of the plurality of bearers required to support the service being based at least in part on the service profile ID.

11. A method for performing admission control at a service level at a base station, the method comprising:
receiving a bearer message for a service;
in response to receiving the bearer message, determining a plurality of bearers required to support the service;
determining, bearer by bearer, whether there are enough resources to support the plurality of bearers;
if the determination is made that there are not enough resources to support a bearer of the plurality of bearers:
 release all reserved resources associated with the plurality of bearers; and
 deny the service; and
if the determination is made that there are enough resources to support the plurality of bearers:
 admit the plurality of bearers; and
 admit the service.

12. The method of claim 11, wherein the bearer message includes at least one service level Allocation and Retention Priority, ARP, parameter for the service, the at least one service level ARP parameter identifying an importance of the service compared to at least one other service; and
the method further comprising:
determining that there are not enough resources to support at least one of the determined plurality of bearers;
determining whether service level pre-emption is available for the service based on the at least one service level ARP parameter;
if service level pre-emption is available, determining whether at least one other service can be preempted;
in response to determining that at least one other service can be preempted, causing resources associated with the other service to be released; and
allocating the released resources to the at least one of the determined plurality of bearers.

13. The method of claim 12, wherein the at least one service level ARP parameter includes at least one of a priority level parameter, a service pre-emption capability parameter and a service pre-emption vulnerability parameter;
the priority level parameter indicating a priority of allocation and retention for the service;
the service pre-emption capability parameter indicating the pre-emption capability of the service on other services; and
the service pre-emption vulnerability parameter indicating vulnerability of the service to pre-emption by other services.

14. The method of claim 13, wherein the determined at least one other service that is preempted is associated with a service pre-emption vulnerability parameter that allows pre-emption and an ARP priority level parameter of the other service indicates a lower priority than the ARP priority level of the service.

15. The method of claim 12, further comprising, in response to determining that no other service can be preempted, determining at least one service that allows for bearer level pre-emption;
in response to determining at least one service that allows for bearer level pre-emption, performing bearer level pre-emption to preempt at least one bearer associated with the at least one service that allows for bearer level pre-emption.

16. The method of claim 11, wherein the bearer message includes a service profile identifier, ID; and
the determining of the plurality of bearers required to support the service being based at least in part on the service profile ID.

17. The method of claim 16, further comprising:
determining whether to terminate at least one bearer for the service;
in response to determining to terminate the at least one bearer, determining the plurality of bearers associated with the service based at least in part on the service profile ID; and
terminating all bearers associated with the service.

18. The method of claim 17, wherein the determining whether to terminate at least one bearer for the service includes determining at least one of service termination and admission rejection during service modification has occurred.

19. The method of claim 11, further comprising:
receiving a bearer modification request; and
one of allowing and rejecting the modification to the service based at least in part on whether the service, as modified, would meet a quality of service requirement for the service.

20. The method of claim 11, wherein the bearer message includes at least one bearer level Allocation and Retention Priority, ARP, parameter;
the method further comprising determining a service profile identifier, ID, associated with the service based at least in part on the at least one bearer level ARP parameter, the determining of the plurality of bearers required to support the service being based at least in part on the service profile ID.

21. A base station for performing admission control at a service level, the base station comprising:
a message receiving module configured to receive a bearer message for a service;
a bearer determining module configured to, in response to receiving the bearer message, determine a plurality of bearers required to support the service; and an admission control module configured to:
- determine, bearer by bearer, whether there are enough resources to support the plurality of bearers;
- if the determination is made that there are not enough resources to support a bearer of the plurality of bearers:
  - release all reserved resources associated with the plurality of bearers; and
  - deny the service; and
- if the determination is made that there are enough resources to support the plurality of bearers:
  - admit the plurality of bearers; and
  - admit the service.

22. A non-transitory computer readable storage medium storing executable instructions for performing admission control at a service level, which when executed by a processor, causes the processor to:
- receive a bearer message for a service;
- in response to receiving the bearer message, determine a plurality of bearers required to support the service;
- determine, bearer by bearer, whether there are enough resources to support the plurality of bearers;
- if the determination is made that there are not enough resources to support a bearer of the plurality of bearers:
  - release all reserved resources associated with the plurality of bearers; and
  - deny the service; and
- if the determination is made that there are enough resources to support the plurality of bearers:
  - admit the plurality of bearers; and
  - admit the service.

* * * * *